(12) United States Patent
Swerdlow

(10) Patent No.: US 12,095,948 B2
(45) Date of Patent: *Sep. 17, 2024

(54) TASK ASSIGNMENT

(71) Applicant: Zoom Video Communications, Inc., San Jose, CA (US)

(72) Inventor: Nick Swerdlow, Santa Clara, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,179

(22) Filed: Jun. 5, 2023

(65) Prior Publication Data

US 2023/0319185 A1 Oct. 5, 2023

Related U.S. Application Data

(63) Continuation of application No. 17/514,244, filed on Oct. 29, 2021, now Pat. No. 11,711,466.

(51) Int. Cl.
*H04M 3/493* (2006.01)
*H04M 3/42* (2006.01)
*H04W 4/10* (2009.01)

(52) U.S. Cl.
CPC ....... *H04M 3/493* (2013.01); *H04M 3/42042* (2013.01); *H04M 3/42348* (2013.01); *H04W 4/10* (2013.01); *H04M 2201/41* (2013.01)

(58) Field of Classification Search
CPC ............. H04M 3/493; H04M 3/42042; H04M 3/42348; H04M 2201/41; H04W 4/10
See application file for complete search history.

(56) References Cited

U.S. PATENT DOCUMENTS

| | | | |
|---|---|---|---|
| 6,170,011 B1* | 1/2001 | Macleod Beck | H04L 67/14 709/224 |
| 8,694,041 B2 | 4/2014 | Denman et al. | |
| 8,700,008 B2 | 4/2014 | Reddy et al. | |
| 9,794,761 B2 | 10/2017 | Mazzarella et al. | |
| 10,382,626 B2* | 8/2019 | Kumar | H04M 3/523 |
| 11,743,118 B2* | 8/2023 | Peloski | H04L 67/1001 709/221 |
| 2002/0078007 A1* | 6/2002 | Herrero | G06Q 10/10 |
| 2007/0117581 A1 | 5/2007 | Chu et al. | |
| 2007/0165799 A1 | 7/2007 | Juncker | |
| 2014/0282095 A1* | 9/2014 | Walters | H04L 65/403 715/753 |
| 2021/0084474 A1 | 3/2021 | Kaplita et al. | |
| 2021/0192422 A1 | 6/2021 | Gutsol et al. | |
| 2021/0259643 A1* | 8/2021 | Frieder | H04L 51/222 |
| 2021/0329419 A1* | 10/2021 | Kee | H04M 3/562 |
| 2021/0366475 A1 | 11/2021 | Wilkosz et al. | |
| 2022/0141616 A1 | 5/2022 | Myshenin et al. | |

OTHER PUBLICATIONS

Walkie Talkie app in Microsoft Teams, https://docs.microsoft.com/en-us/microsoftteams/walkie-talkie, Aug. 26, 2021, 6 pages.
How Verizon Pust to Talk Plue is elevating field communications, https://insights.samsung.com/2020/10/01/how-verizon-push-to-talk-plus-is-elevating-field-communications/, Poornima Apte, Oct. 1, 2020, 7 pages.

* cited by examiner

*Primary Examiner* — Lisa Hashem
(74) *Attorney, Agent, or Firm* — Young Basile Hanlon & MacFarlane, P.C.

(57) ABSTRACT

The server receives a response accepting a task from a device. The server assigns the task to a user of the device. The server transmits an indication that the task was assigned to the user of the device.

20 Claims, 10 Drawing Sheets

| EMPLOYEE ID | TASKS COMPLETED | WORK HOURS |
|---|---|---|
| 1 | 80 | 9AM-5PM |
| 2 | 40 | 11AM-2PM |
| 3 | 5 | 9AM-10AM, 3PM-4PM |
| 4 | 1 | 10AM-11AM |
| 5 | 1 | 10AM-11:30AM |
| 6 | 72 | 9AM-5PM |

TASK ASSIGNMENT

FIELD

This disclosure relates to task assignment via multicast communication, such as task assignment techniques that may be used with software services implemented over a network.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
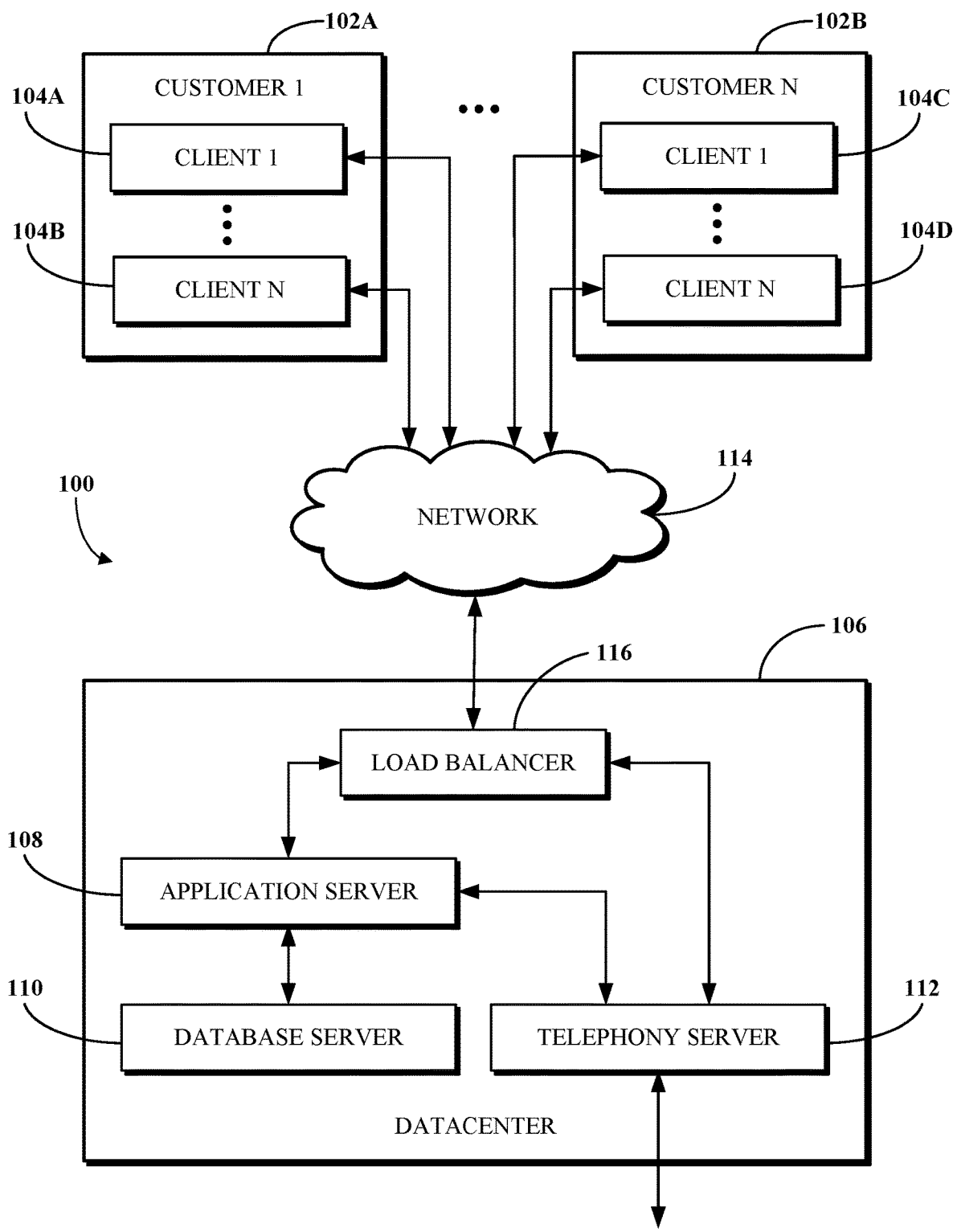
FIG. 1 is a block diagram of an example of an electronic computing and communications system.

Multicast or "one-to-many" communication refers to a message being transmitted from a single device to multiple devices. One example of multicast communication is push-to-talk (PTT). In PTT, a message is generated at a single device and transmitted to one or more devices, where it is played using a speaker or other audio output. In some examples of PTT, a sending user presses a button on a sending device to speak and the message spoken by the sending user is transmitted, over a unicast or multicast connection, to receiving device(s). The message is then played at the receiving device(s), for example, using a speaker or other audio output of the receiving device(s).

Push-to-talk over cellular (PoC) is a service option for a cellular phone network that enables subscribers to use their phones as walkie-talkies with unlimited range. A push-to-talk connection may connect almost instantly (without any intentional delay, for example, within 5 seconds, within 1 second, or within 0.5 seconds). A significant advantage of PTT is the ability for a single person to reach an active talk group with a single button press; users need not make several telephone calls to coordinate with a group. Alternatively, PTT may be implemented in an application (or other software) running on client device(s), for example, a mobile phone, a tablet computer, a laptop computer, a desktop computer, or a smartwatch.

PTT may in some cases be used to notify a large group of people that a certain task needs to be done. For example, in a supermarket setting, PTT may be used to notify the cleaning team that there is a spill in some location. However, assigning more complex tasks over PTT or ensuring that the given task is assigned to exactly one person (and not multiple people simultaneously) may be technically challenging. For example, a supervisor might state, to multiple subordinates, that a task (e.g., "cleanup on aisle 3") needs to be done using a PTT. In response, multiple subordinates might accept the task and begin working on it. This may result in too many subordinates trying to complete the task, as the subordinates do not know to whom the task is assigned.

Implementations of this disclosure address problems such as these by creating and assigning tasks by leveraging multicast technology, for example, PTT. The tasks may be assigned in an environment where multiple users are available to complete a task, but only one user (or another subset of users) should be assigned the task.

According to some implementations, a server provides an interactive voice response (IVR) menu extension for generating the task to a sender device. The IVR menu may include prompts associated with creating a task of a given type. For example, in a takeout restaurant, a user of the sender device (e.g., a customer or a delivery driver picking up the takeout meal) may be prompted to specify his/her order number (or another identifier of the order) and parking spot number (or another indication of where he/she is located). The server receives data associated with the task from the sender device in response to the IVR menu extension. For example, the sender device may specify that order number ABC should be delivered to parking spot D.

The server transmits the task to client devices (e.g., associated with waitstaff at the restaurant) using PTT or another multicast technology. The server receives a response accepting the task from a device of the client devices. The server assigns the task to a user of the device. The server transmits an indication that the task was assigned to the user of the device to all or a subset of the client devices.

To describe some implementations in greater detail, reference is first made to examples of hardware and software structures used to implement multicast task assignment. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
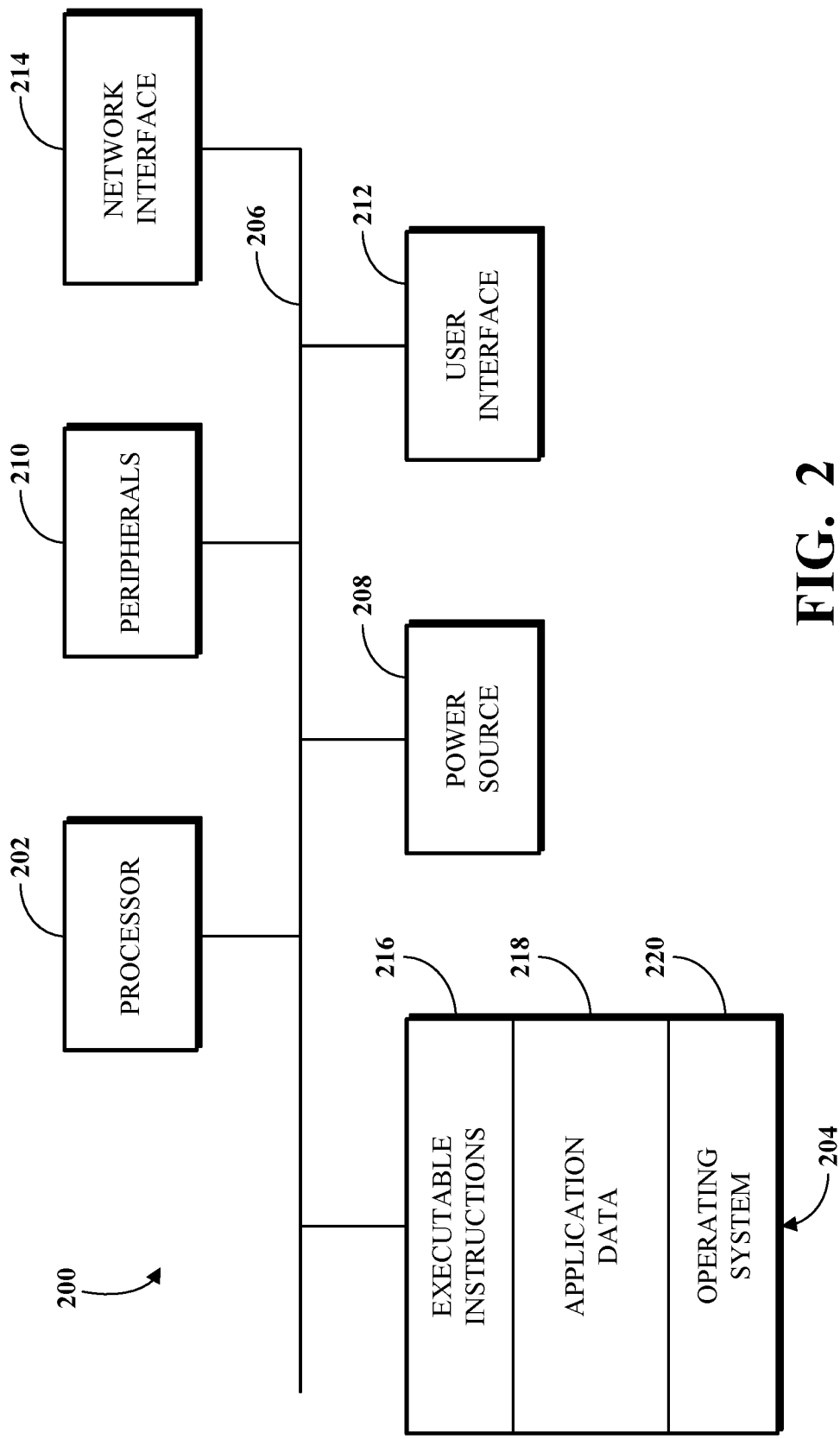
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
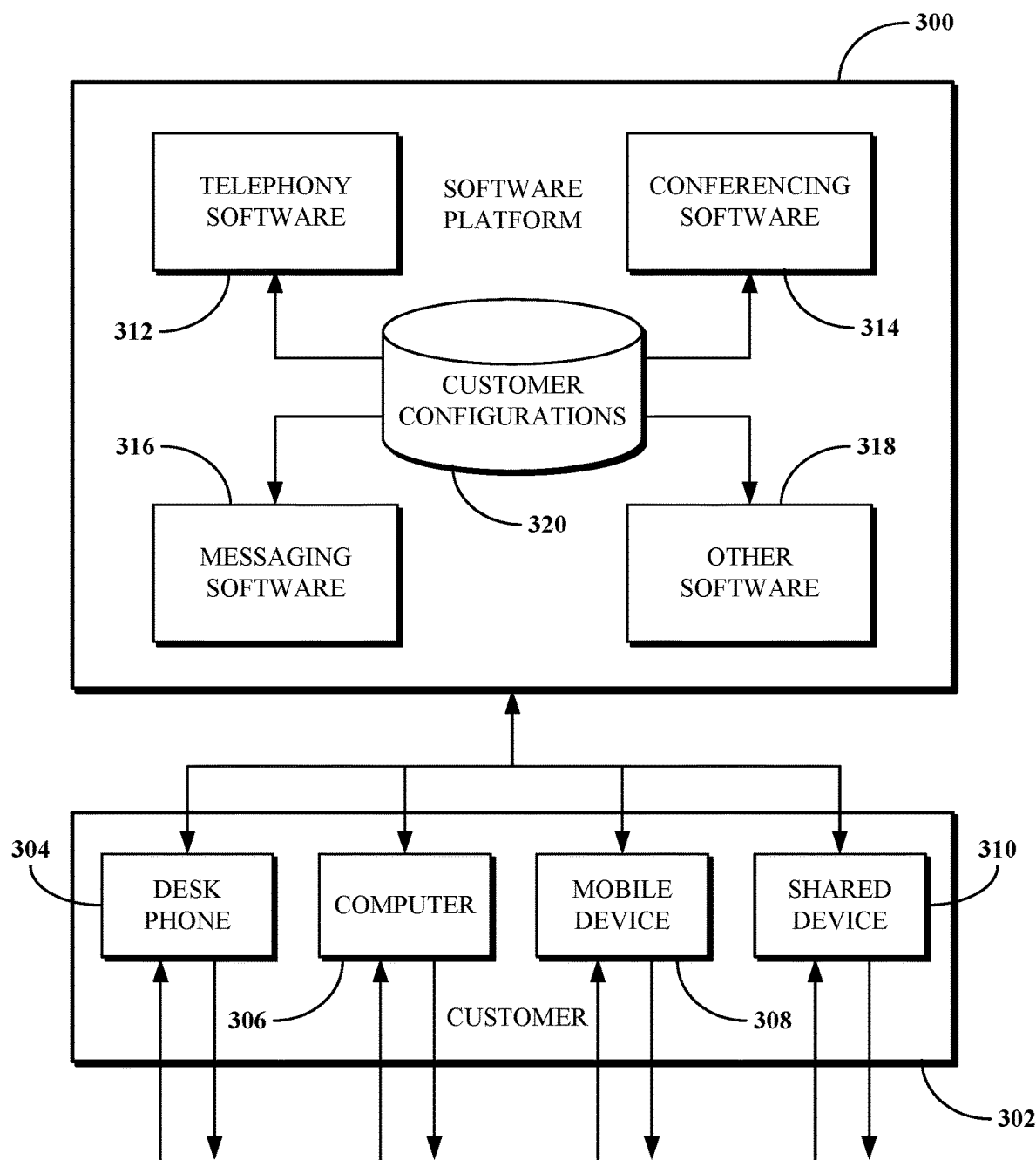
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for multicast task assignment.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
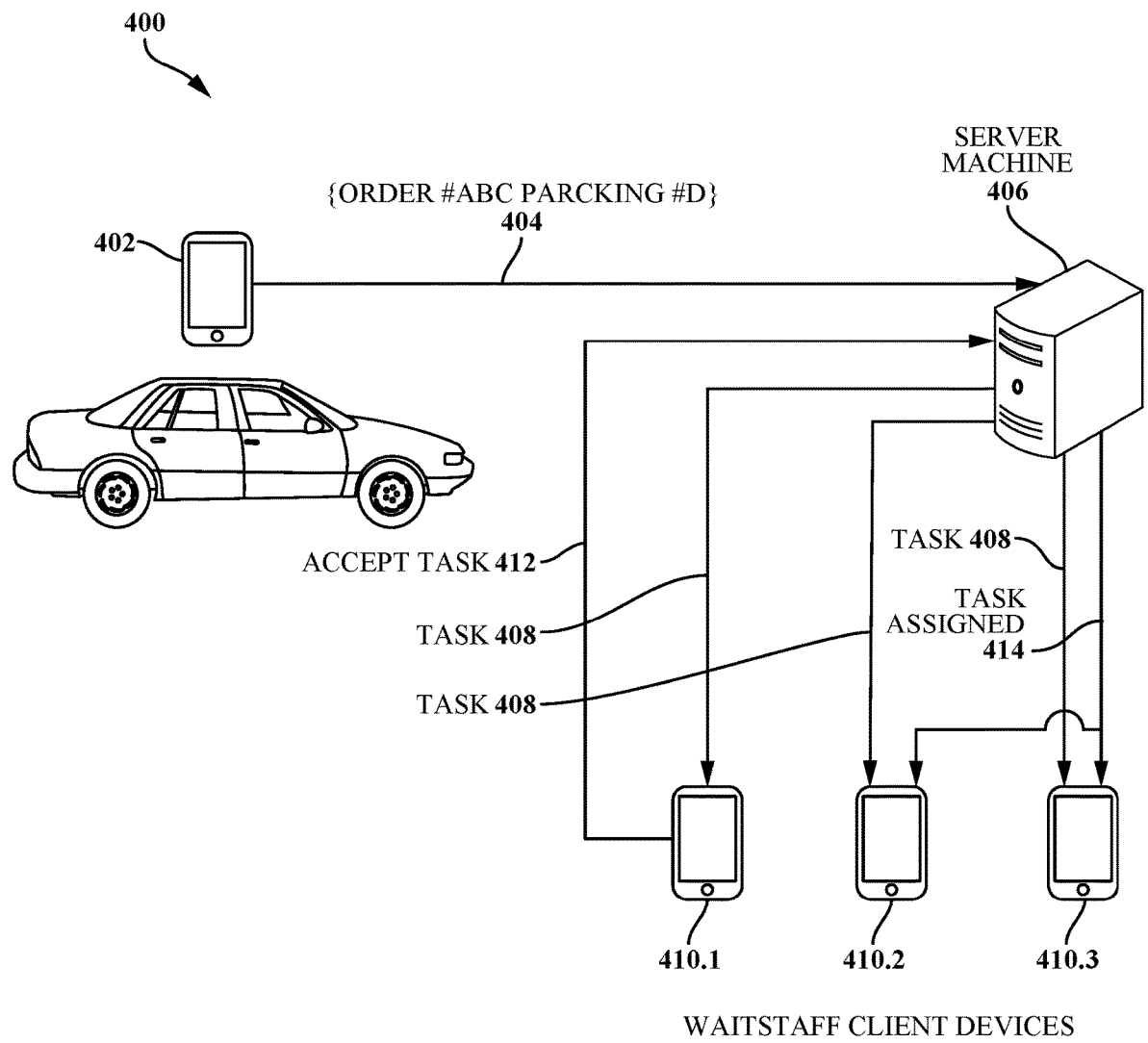
FIG. 4 is a diagram of an example order fulfillment system which can use multicast task assignment.

FIG. 4 is a diagram of an example order fulfillment system 400 which can use multicast task assignment. As shown, the system 400 includes a customer device 402, a server machine 406, and client devices 410. Each of the customer device 402 and the client devices 410 may be an end-user computing device that includes processing circuitry, memory, and a network interface, for example, a mobile phone, a tablet computer, a laptop computer, a desktop computer, or a smartwatch. The server machine 406 may include one or more servers, with each server including processing circuitry, memory, and a network interface.

The order fulfillment system 400 is used for curbside or other delivery of an order placed by a user of the customer device 402, such as at a restaurant, grocery store, department store, or like business which has multiple workers fulfilling such orders in which at least a subset of the workers is a user of a client device 410. As illustrated in FIG. 4, the customer device 402 transmits task-related information 404 to the server machine 406. As shown, the task-related information 404 includes an order number and a parking spot number. In other implementations, different task-related information may be included. According to some implementations, the server machine 406 provides an IVR menu extension for generating the task-related information 404 to the customer device 402, and the customer device 402 provides the task-related information 404 to the server machine 406 in response to the IVR menu extension.

The server machine 406 generates a task 408 based on the task-related information 404. The task 408 may include delivering item(s) associated with the referenced order number to the referenced parking spot number. As shown, the server machine 406 transmits the task 408 to client devices 410. While three client devices 410 are shown, there may be other numbers of client devices 410. In response, one of the client devices 410.1 transmits an accept task message 412 accepting the task 408. The server machine 406 records that the task 408 is assigned to a user of the accepting client device 410.1. The server machine 406 transmits (e.g., using PTT or another multicast technology or using paging technology) a task assigned message 414 to the other client devices 410.2, 410.3, informing the other client devices 410.2, 410.3 that the task 408 has been assigned.

The user of the accepting client device 410.1 then performs the task 408 (e.g., brings the ordered item(s) to the referenced parking spot). Upon completing performance of the task 408, the user of the accepting client device 410.1 may transmit a message indicating that performance of the task 408 has been completed to the server machine 408 from the accepting client device 410.1.

The server machine 406 may store a data structure representing a set of tasks and a status (e.g., received, assignment pending, assigned, completed) for each task. For each member of the worker group using the client devices 410, the server machine 406 may store a status (e.g., online, offline, on duty, off duty, task assigned, no task assigned, and the like) and other data (e.g., geographic position, tasks previously completed, and the like). This information may be useful for a manager in managing and evaluating performance of the worker group, as well as in quickly verifying the status of each task. This is discussed in more detail in conjunction with FIG. 6.

The technology disclosed in FIG. 4 may be used in multiple different settings. For example, in a supermarket setting, a supervisor could create a cleanup task by specifying a location in the supermarket (e.g., Aisle 12A) and what needs to be cleaned up (e.g., spill); the task could be provided to the cleaning staff. In an airplane, a task might include a seat (e.g., 23D) and items or services requested (e.g., tissues); the task could be provided to flight attendants. The customer device 402 may be replaced with another device responsible for generating task-related information.

Figure 5:
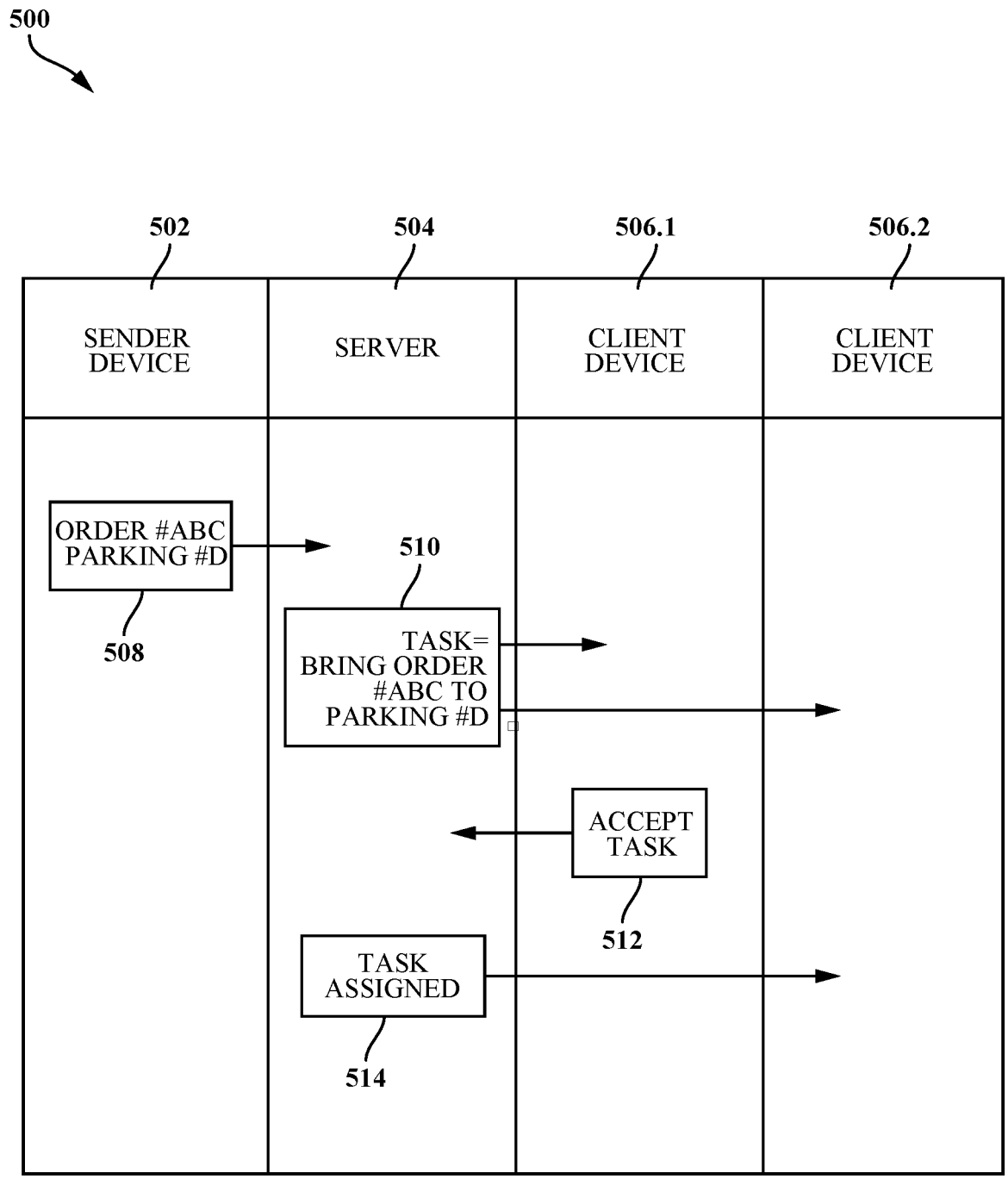
FIG. 5 is a data flow diagram for an example of multicast task assignment.

FIG. 5 is a data flow diagram 500 for an example of multicast task assignment. As shown, the data flow diagram 500 leverages a sender device 502 (e.g., the customer device 402), a server 504 (e.g., the server machine 506) and client devices 506 (e.g., the client devices 410). While two client devices 506 are illustrated, other numbers of client devices may be used.

At block 508, the sender device 502 generates task-related information (order #ABC, parking #D) and transmits the task-related information to the server 504.

At block 510, the server 504 generates a task ("Bring order #ABC to parking #D") based on the task-related information. The server 504 transmits the task to the client devices 506 using a multicast technology, for example, PTT or paging technology.

At block 512, client device 506.1 accepts the task and signals its acceptance to the server 504. Upon receiving the task acceptance message, the server 504 may identify that a user of the client device 506.1 is the accepting party using voiceprint intelligence or voice-identification technology. Voiceprint technology may identify an individual based on the sound of his/her voice using parameters of the individual's voice, including tone, pitch, pacing and fluctuations in the sound. Identifying may include determining whether an individual who made a new utterance is the same as the individual who made previous utterances that are associated with the individual. In some embodiments, the client device 506.1 accepts the task by tapping a button displayed on a touchscreen of the client device 506.1 for accepting the task. Alternatively, the user of the client device 506.1 could use the client device 506.1 to transmit his/her name and an indication of acceptance (e.g., "John Doe accepts this task"). In some implementations, the server 504 receives a signal from the client device 506.1 and identifies the user accepting the task based on an identifier, within the signal, of the client device 506.1

At block 514, the server 504 notifies the other client device 506.2 that the task has been assigned and is no longer available for assignment. While a single other client device 506.2 is illustrated, in alternative implementations, there could be multiple other client devices, and at least a subset of those other client devices may be notified that the task has been assigned by receiving the notification from the server 504.

In some implementations, the client devices to which the task is transmitted may be selected based on information associated with a team that is responsible for the task. For example, if the task is a cleanup task, the task may be submitted only to members of the cleanup team. In some examples, the client devices receiving the task may be further limited based on team members who are on duty, team members who are present in the store, team members that are physically located proximate to the place where the cleanup is to be done, and the like. Prior to transmitting the task, the client devices to receive the task may be selected based on at least one of an identifier of a team type (e.g., maintenance, janitorial, or inventory) of one or more of the client devices, a geographic location of one or more of the client devices, one or more other tasks accepted by one or more of the client devices, a status indicator (e.g., busy or available) of one or more of the client devices, or a geographic position of one or more of the client devices.

Figure 6:
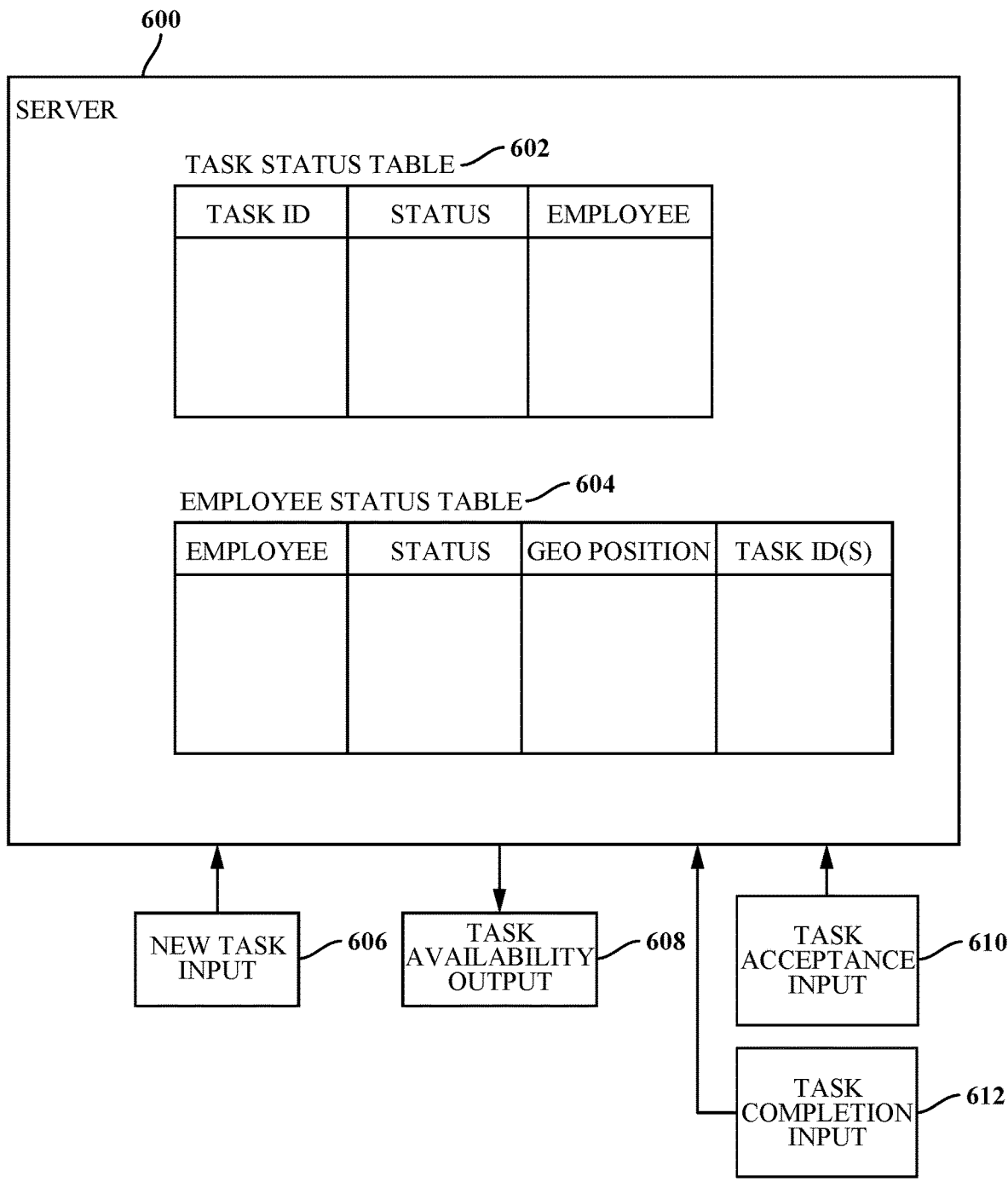
FIG. 6 is a block diagram of an example of a server.

FIG. 6 is a block diagram of an example of a server 600. The server 600 may correspond to the server machine 406 or the server 504. As shown, the server 600 stores a task status table 602 and an employee status table 606. The task status table 602 stores, for each task, a task identifier (ID), a status, and employee(s) assigned to the task. The task status may be one of: received, assignment pending, assigned, and completed. The employee status table 604 stores, for each employee, a status, a geographic position, and task ID(s) being handled by the employee. The status may be one or more of: online, offline, on duty, off duty, task assigned, no task assigned, and the like.

As shown in FIG. 6, the server 600 receives a new task input 606 (e.g., task-related information 404 and block 508). Upon receiving the new task input 606, the server 600 creates, in the task status table 602, a new task ID with the status received. The server 600 generates a task availability output 608 and updates the task status to assignment pending in the task status table 602. The server 600 receives a task acceptance input 610 (e.g., using PTT or one-to-one communication) from one of the client devices (not shown in FIG. 6). Upon receiving the task acceptance input 610, the server 600 updates the task status to assigned. The server 600 also updates the employee status table 604 to indicate that the task was assigned to the accepting employee. When the server 600 receives a task completion input 612 (e.g., using PTT or one-to-one communication) indicating that the task is completed, the task status may be changed to completed.

Figure 7:
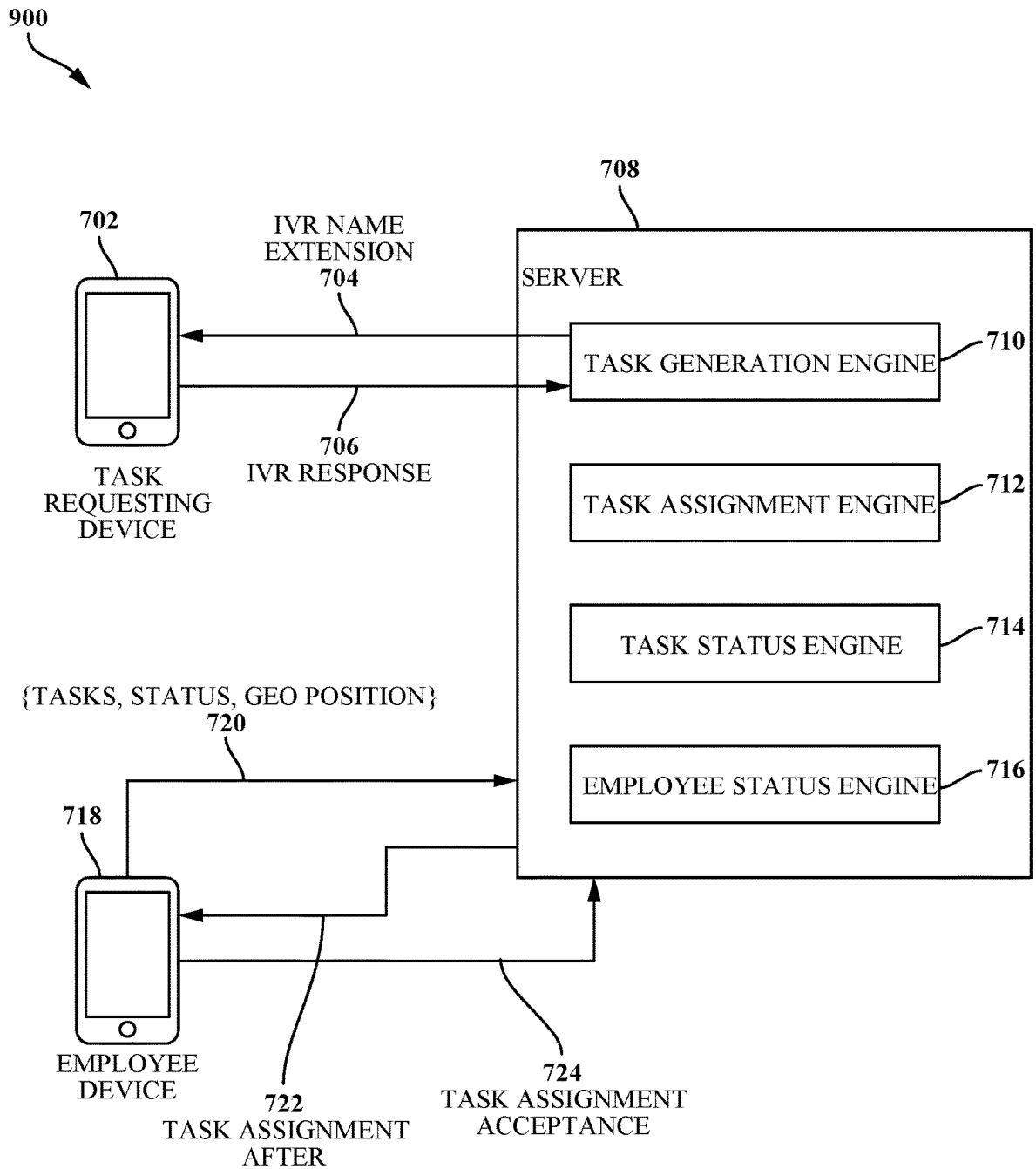
FIG. 7 is a block diagram of an example task management system.

FIG. 7 is a block diagram of an example task management system 700. As shown, the task management system includes a task requesting device 702, a server 708, and an employee device 718. The task requesting device 702 may correspond to the customer device 402 or the sender device 502. The server 708 may correspond to the server machine 406, the server 504 or the server 600. The employee device 718 may correspond to one of the client devices 410 or one of the client devices 506.

As shown, the server 708 includes a task generation engine 710, a task assignment engine 712, a task status engine 714, and an employee status engine 716. The task generation engine 710 generates task(s) by communicating with the task requesting device 702. As shown, the task generation engine 710 provides an IVR menu extension 704 to the task requesting device 702. In response, the task requesting device 702 provides an IVR response 706 that includes task-related information to the task generation engine 710. The task generation engine 710 generates the task based on the task-related information in the IVR response.

The task assignment engine 712 then assigns the task by sending a task assignment offer 722 to the employee device 718 and other devices (not shown in FIG. 7). In response, the server 708 receives a task assignment acceptance 724 from the employee device 718. The task status engine 714 and/or the employee status engine 716 record that a user of the employee device 718 accepted the task and is working on the task, with the task status engine 714 being responsible for tracking individual tasks and the employee status engine 716 being responsible for tracking individual employees. A user (e.g., a manager) accessing the server 708 may leverage the task status engine 714 to determine the status of a task (e.g., in response to a customer asking when his/her task will be completed) or may leverage the employee status engine 716 to determine the status of an employee (e.g., whether a given employee is not accepting any tasks or has too many tasks to complete). The status of the employee may include tasks assigned to the employee, tasks completed by the employee, the employee's work hours, the employee's geographic position (e.g., determined by a mobile device of the employee), whether the employee's mobile device is online, and the like. Periodically, the server 708 may receive, from the employee device 718, a message 720 indicating tasks assigned to the employee, a status of the tasks, and a geographic position of the employee. The geographic position of the employee may be determined using assisted global positioning system (A-GPS) or Wi-Fi® hotspot triangulation at the employee device 718 to identify an exact position of the employee device 718 within a business (e.g., second floor, aisle 8A). (The employee is assumed to be at the same geographic position as the employee device 718.)

Figure 8:
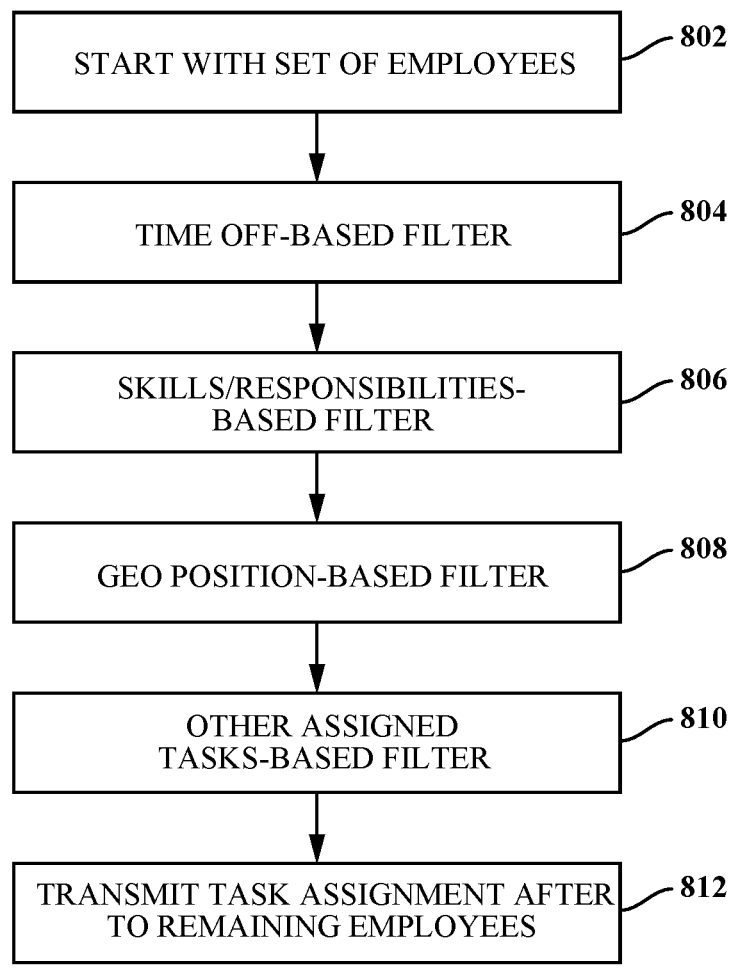
FIG. 8 is a diagram of an example employee data table.

FIG. 8 is a diagram of an example employee data table 800. The employee data table 800 may be generated, for example, using the employee status engine 716. As shown, the employee data table 800 includes an employee ID column 802, a task completed column 804, and a work hours column 806. The employee data table 800 may be used, for example, by a manager to assess performance of employees. For instance, as shown in the employee data table 800, employee ID #4 performed a single task in a one-hour shift, while employee ID #2 performed 40 tasks in a three-hour shift. A manager might be interested in investigating why employee ID #4 is so much less efficient than employee ID #2.

Figure 9:
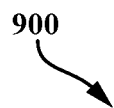
FIG. 9 is a flow chart of an example of a technique for employee filtering for task assignment.
Figure 10:
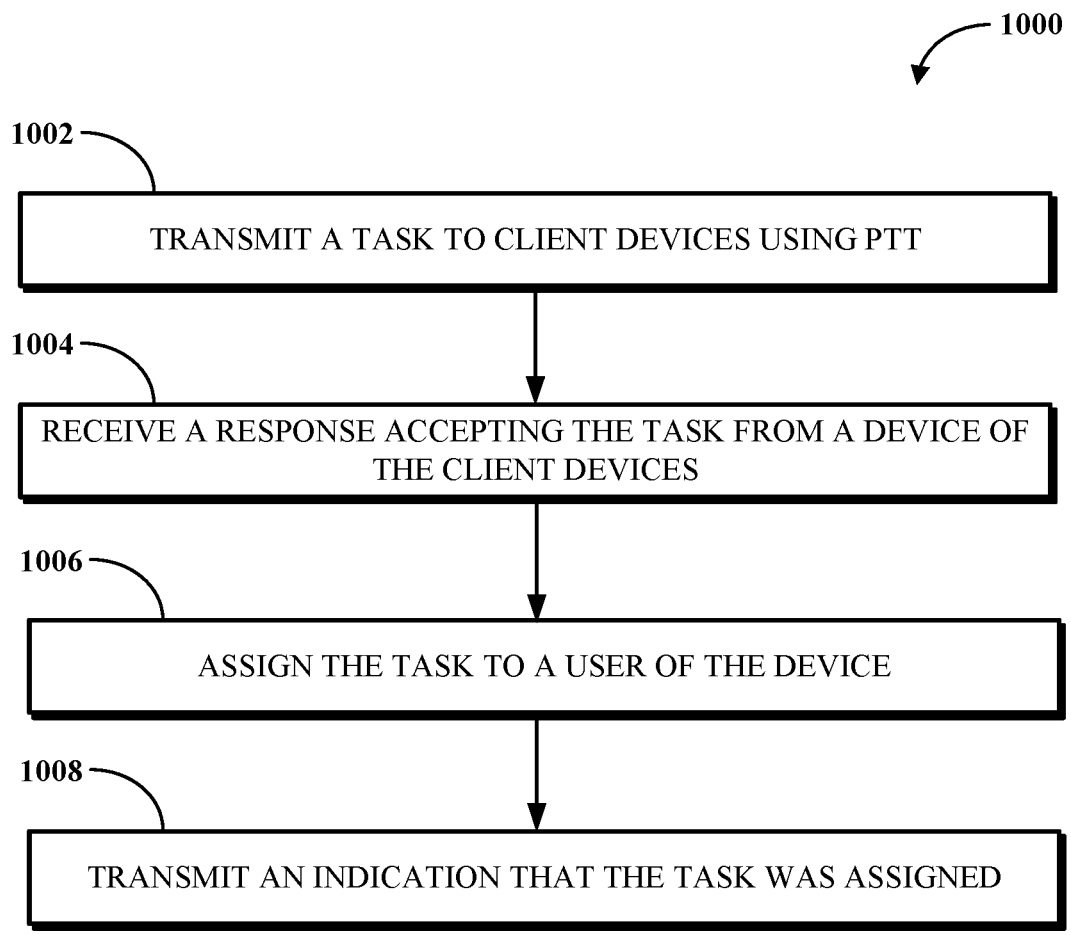
FIG. 10 is a flowchart of an example of a technique for multicast task assignment.

To further describe some implementations in greater detail, reference is next made to examples of techniques which may be performed by or using a multicast task assignment engine at a server. FIG. 9 is a flow chart of an example of a technique 900 for employee filtering for task assignment, and FIG. 10 is a flowchart of an example of a technique 1000 for multicast task assignment. The techniques 900 or 1000 can be executed using computing devices, such as the systems, hardware, and software described with respect to FIGS. 1-8. The techniques 900 and 1000 can be performed, for example, by executing a machine-readable program or other computer-executable instructions, such as routines, instructions, programs, or other code. The steps, or operations, of the techniques 900 and 1000 or another technique, method, process, or algorithm described in connection with the implementations disclosed herein can be implemented directly in hardware, firmware, software executed by hardware, circuitry, or a combination thereof.

For simplicity of explanation, the techniques 900 and 1000 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 9 illustrates a technique 900 for employee filtering for task assignment. The technique 900 may be implemented at a server to identify employees to whom a task assignment could be offered, using the techniques described herein.

At block 902, the server starts with a set of employees (e.g., all employees of a supermarket). The set of employees may include all employees, all employees having mobile devices, or all employees having computing devices. The set of employees may be stored at the server or at a data repository (e.g., database) coupled with the server.

At block 904, the server applies a time off-based filter to the set of employees, to remove the employees who are not on duty from the set. Employees work hours may be stored at the server or at the data repository coupled with the server. The server or the data repository may also store a list of employees who are expected to be on duty but are out for paid or unpaid time off (e.g., due to vacation, sick leave, and the like).

At block 906, the server applies a skills/responsibilities-based filter to the set of employees, to remove employees whose skills/responsibilities are not aligned with the task. For example, cleanup employees may be responsible for and skilled in cleaning up spills while customer service specialist employees might be responsible for and skilled in handling customer complaints or providing assistance to customers. In some cases, the server or the data repository stores the skills/responsibilities of each employee or a subset of the employees.

At block 908, the server applies a geographic position-based filter. The geographic position-based filter may leverage A-GPS to identify employees who are proximate to a location where they are needed. For example, if there is a spill, a cleanup employee who is proximate to the spill could handle it much more quickly than an employee who is on the other side of the store.

At block 910, the server applies an other assigned task-based filter. For example, employees who are busy with other tasks might not be offered the new task so as not to overwhelm the employees and to ensure that all of the on-duty employees are equally busy. Employees who do not have other assigned tasks may be prioritized for assignment of the new task being offered.

At block 912, the server transmits (e.g., using multicast technology such as PTT) the task assignment offer to the remaining employees who were not filtered out of the set in blocks 804-810. One of the employees may accept the task using the techniques disclosed herein. The task may be assigned to the accepting employee.

In some cases, a manager may manually assign a task to an employee. The employee data table(s) and the task data table(s) may be updated to reflect the manual assignment. The manager may notify the server of the assignment and may notify the employee using multicast communication or a direct communication to the employee (e.g., in person or via the employee's device).

FIG. 10 illustrates a technique 1000 for multicast task assignment.

At block 1002, a server (e.g., the server machine 402, the server 504, the server 600 or the server 708) transmits a task to client devices (e.g., the client devices 410, the client devices 506 or the employee device 718) using PTT. According to some implementations, the server provides an IVR menu extension for generating information related to the task to a sender device (e.g., the customer device 402, sender device 502 or task requesting device 702). The server receives the information related to the task from the sender device in response to the IVR menu extension. The server generates the task based on the information.

At block 1004, the server receives a response accepting the task from a device of the client devices. The response may be delivered using an audio transmission, for example, over the PTT connection. In some implementations, the server identifies the user of the device by applying voice-print intelligence (or other voice recognition technology) to the response accepting the task. The response might not (e.g., when executing some implementations of PTT) include an indication of the device transmitting the response.

At block 1006, the server assigns the task to a user of the device. The server may store, in its local memory or in a data repository, that the task is assigned to the user of the device. According to some implementations, the server stores a data structure representing a set of tasks including the task and a status of each task.

At block 1008, the server transmits an indication that the task was assigned to the user of the device to at least a subset of the client devices. The indication may be transmitted over a PTT connection. When the task is completed, the server may receive an indication that the task was completed. The server may store an indication that the user of the device completed the task.

According to some implementations, the server identifies, prior to transmitting the task to the client devices, the client devices based on information associated with a team responsible for the task.

According to some implementations, the server identifies, prior to transmitting the task to the client devices, the client devices based on membership in a team responsible for the task and at least one of a geographic location of one or more of the client devices, one or more other tasks accepted by one or more of the client devices, a status indicator of one or more of the client devices, or a geographic position of one or more of the client devices.

According to some implementations, the server identifies the device using voiceprint intelligence.

According to some implementations, the server identifies the device using voice-identification technology.

Some implementations are described in conjunction with a task assignment being transmitted using PTT. However, it is possible that the task assignment technique could be completed using technologies other than PPT (e.g., text-based or image-based messaging). For example, the messages described herein could be transmitted using text messages (e.g., short messaging service (SMS) messages or text messages in a messaging application). Alternatively, a user could take a picture associated with a task (e.g., a picture of a broken glass bottle and a spill) within the text or image messaging application and receive responses accepting the task as described herein.

In some implementations, the disclosed technique may include intelligence to understand which users of client devices are likely to claim which assignments. For example, some users might prefer to handle pickup orders and some users might prefer to handle cleanup orders. In some embodiments, if two tasks arrive at the server simultaneously, the server may decide to couple the tasks. For example, if takeout orders need to be delivered to two adjacent parking spots, the server might decide to merge the two tasks into a single task. The intelligence to understand which users of client devices are likely to claim which assignments may be determined based on past tasks accepted by the users, using statistical or artificial intelligence techniques. The statistical or artificial intelligence techniques may include Bayesian analysis or artificial neural networks. Alternatively, a manager can manually assign the task to a user. The manual assignment may be communicated directly to the user (and entered into the server). The manual assignment may be communicated to the user (and other users) over the multicast (e.g., PTT) or paging technology. The manual assignment may be communicated to the user in a unicast communication to his/her device.

Some implementations may be designed to connect with a customer and employee management system without changing the system. For example, an engine implementing the disclosed technology could access tasks in the management system and forward the tasks to the employee client devices for assignment. Upon assignment of a task to an employee, the engine may update data stored in the employee management system.

Some implementations are described below as numbered examples (Example 1, 2, 3, etc.). These examples are provided as examples only and do not limit the disclosed technology.

Example 1 is a method comprising: transmitting a task to client devices using PTT; receiving a response accepting the task from a device of the client devices; assigning the task to a user of the device; and transmitting an indication that the task was assigned to the user of the device to at least a subset of the client devices.

In Example 2, the subject matter of Example 1 includes, providing an IVR menu extension for generating information related to the task to a sender device; receiving the information related to the task from the sender device in response to the IVR menu extension; and generating the task based on the information.

In Example 3, the subject matter of Examples 1-2 includes, identifying, prior to transmitting the task to the client devices, the client devices based on information associated with a team responsible for the task.

In Example 4, the subject matter of Examples 1-3 includes, identifying, prior to transmitting the task to the client devices, the client devices based on membership in a team responsible for the task and at least one of a geographic location of one or more of the client devices, one or more other tasks accepted by one or more of the client devices, a status indicator of one or more of the client devices, or a geographic position of one or more of the client devices.

In Example 5, the subject matter of Examples 1-4 includes, identifying the device using voiceprint intelligence.

In Example 6, the subject matter of Examples 1-5 includes, identifying the device using voice-identification technology.

In Example 7, the subject matter of Examples 1-6 includes, receiving an indication that the task was completed; and storing an indication that the user of the device completed the task.

In Example 8, the subject matter of Examples 1-7 includes, storing a data structure representing a set of tasks including the task and a status of each task.

Example 9 is at least one machine-readable medium including instructions that, when executed by processing circuitry, cause the processing circuitry to perform operations to implement of any of Examples 1-8.

Example 10 is an apparatus comprising means to implement of any of Examples 1-8.

Example 11 is a system to implement of any of Examples 1-8.

Example 12 is a method to implement of any of Examples 1-8.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
receiving, at one or more servers, a response accepting a task from a client device;
transmitting, from the one or more servers, a first indication that the task was assigned to a user of the client device;
storing, in memory, a task status and a user status, the task status indicating that the task is assigned to the user, and the user status indicating that the user is performing the task and indicating past tasks assigned to the user;
receiving, from the client device, a second indication that the task was completed;
in response to the second indication, updating the task status and the user status;
transmitting the updated task status in response to a query; and
transmitting the updated user status to a manager device of a manager to evaluate the user.

2. The method of claim 1, further comprising:
providing an interactive voice response (IVR) menu extension to a sender device, wherein the IVR menu extension generates information related to the task;
receiving the information related to the task from the sender device in response to the IVR menu extension; and
generating the task based on the information.

3. The method of claim 1, further comprising:
transmitting the task to client devices including the client device; and
identifying, prior to transmitting the task to the client devices, the client devices based on membership data associated with a team responsible for the task.

4. The method of claim 1, further comprising:
transmitting the task to client devices including the client device; and
identifying, prior to transmitting the task, the client devices based on membership in a team responsible for the task and at least one of a geographic location of one or more of the client devices, one or more other tasks accepted by one or more of the client devices, or a status indicator of one or more of the client devices.

5. The method of claim 1, further comprising:
identifying the user of the client device by applying voiceprint intelligence to the response accepting the task, wherein the response does not include an indication of the client device transmitting the response.

6. The method of claim 1, further comprising:
using voice-identification technology to identify a user of the client device, wherein the response does not include an indication of the client device transmitting the response.

7. The method of claim 1, further comprising:
receiving an indication that the task was completed; and
storing the indication that the task was completed in a data structure associated with the user.

8. The method of claim 1, further comprising:
storing a data structure representing a set of tasks including the task and a status of each task.

9. The method of claim 1, further comprising:
transmitting the task to client devices including the client device; and
identifying the client devices from a set based on one or more tasks previously accepted by users of the client devices, the one or more tasks previously accepted by the users being stored in a data structure in memory.

10. A system comprising:
one or more memories; and
one or more processors configured to execute instructions stored in the one or more memories to:

receive, at one or more servers, a response accepting a task from a client device;

transmit, from the one or more servers, a first indication that the task was assigned to a user of the client device;

store, in memory, a task status and a user status, the task status indicating that the task is assigned to the user, and the user status indicating that the user is performing the task and indicating past tasks assigned to the user;

receive, from the client device, a second indication that the task was completed;

in response to the second indication, update the task status and the user status;

transmit the updated task status in response to a query; and transmit the updated user status to a manager device of a manager to evaluate the user.

11. The system of claim 10, the one or more processors being further configured to execute instructions stored in the one or more memories to:

provide an interactive voice response (IVR) menu extension to a sender device, wherein the IVR menu extension generates information related to the task;

receive the information related to the task from the sender device in response to the IVR menu extension; and generate the task based on the information.

12. The system of claim 10, the one or more processors being further configured to execute instructions stored in the one or more memories to:

transmit the task to client devices including the client device; and identify, prior to transmitting the task to the client devices, the client devices based on membership data associated with a team responsible for the task.

13. The system of claim 10, the one or more processors being further configured to execute instructions stored in the one or more memories to:

transmit the task to client devices including the client device; and identify, prior to transmitting the task, the client devices based on membership in a team responsible for the task and at least one of a geographic location of one or more of the client devices, one or more other tasks accepted by one or more of the client devices, or a status indicator of one or more of the client devices.

14. The system of claim 10, the one or more processors being further configured to execute instructions stored in the one or more memories to:

identify the user of the client device by applying voiceprint intelligence to the response accepting the task, wherein the response does not include an indication of the client device transmitting the response.

15. The system of claim 10, the one or more processors being further configured to execute instructions stored in the one or more memories to:

use voice-identification technology to identify a user of the client device, wherein the response does not include an indication of the client device transmitting the response.

16. The system of claim 10, the one or more processors being further configured to execute instructions stored in the one or more memories to:

receive an indication that the task was completed; and storing the indication that the task was completed in a data structure associated with the user.

17. One or more non-transitory computer-readable media storing instructions operable to cause one or more processors to perform operations comprising:

receiving, at one or more servers, a response accepting a task from a client device;

transmitting, from the one or more servers, a first indication that the task was assigned to a user of the client device;

storing, in memory, a task status and a user status, the task status indicating that the task is assigned to the user, and the user status indicating that the user is performing the task and indicating past tasks assigned to the user;

receiving, from the client device, a second indication that the task was completed;

in response to the second indication, updating the task status and the user status;

transmitting the updated task status in response to a query; and transmitting the updated user status to a manager device of a manager to evaluate the user.

18. The one or more non-transitory computer-readable media of claim 17, the operations further comprising:

providing an interactive voice response (IVR) menu extension to a sender device, wherein the IVR menu extension generates information related to the task;

receiving the information related to the task from the sender device in response to the IVR menu extension; and generating the task based on the information.

19. The one or more non-transitory computer-readable media of claim 17, the operations further comprising:

transmitting the task to client devices including the client device; and identifying, prior to transmitting the task, the client devices based on membership data associated with a team responsible for the task.

20. The one or more non-transitory computer-readable media of claim 17, the operations further comprising:

transmitting the task to client devices including the client device; and identifying, prior to transmitting the task, the client devices based on membership in a team responsible for the task and at least one of a geographic location of one or more of the client devices, one or more other tasks accepted by one or more of the client devices, or a status indicator of one or more of the client devices.

* * * * *